Figure 1:
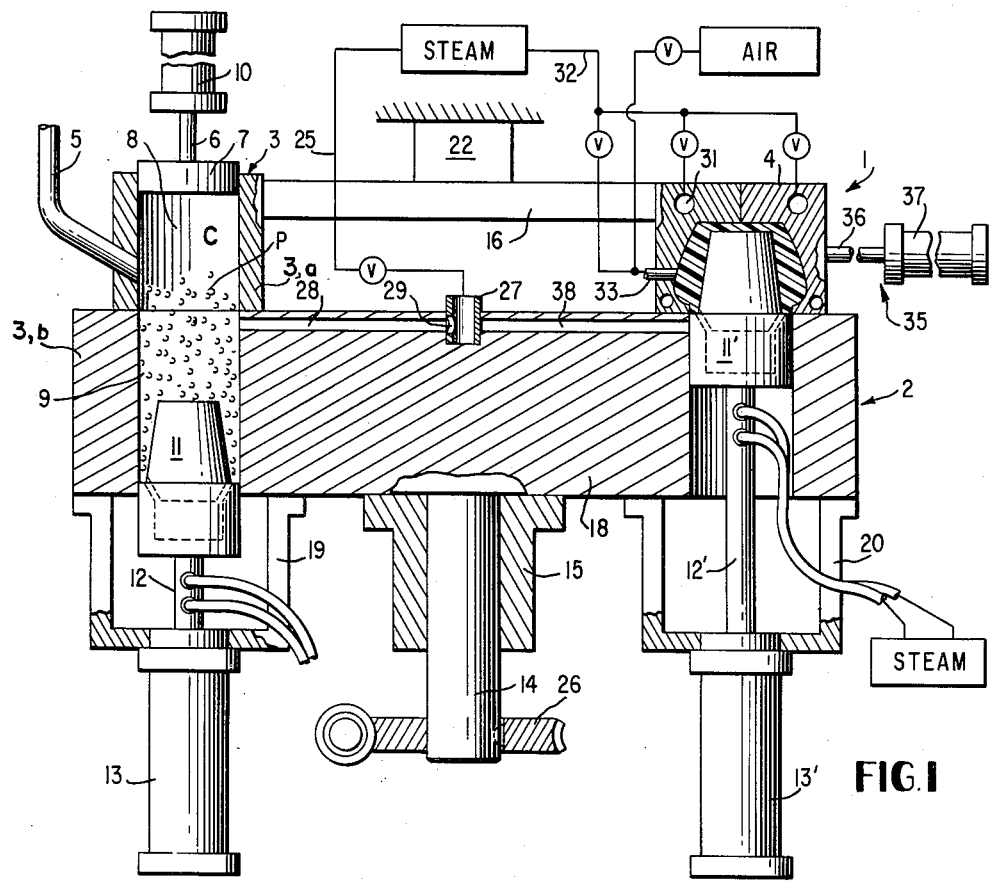

April 21, 1964  J. E. HEIDER  3,129,464

MOLDING APPARATUS

Filed Nov. 15, 1960

INVENTOR
JAMES E. HEIDER

BY *W. A. Schaich and Charles S. Lynch*

ATTORNEYS

United States Patent Office 3,129,464
Patented Apr. 21, 1964

3,129,464
MOLDING APPARATUS
James E. Heider, Princeton, N.J., assignor to Owens-Illinois Glass Company, a corporation of Ohio
Filed Nov. 15, 1960, Ser. No. 69,308
4 Claims. (Cl. 18—20)

This invention relates to a molding apparatus and particularly to an apparatus for molding articles from foamable or expandable plastics preferably in the form of beads.

In recent years foamable or expandable plastic beads have come into widespread use for making plastic articles. These beads consist of a suitable plastic, such as polystyrene in which there has been incorporated a foaming agent. These foamable beads which have different trade names or marks are obtainable from a number of chemical manufacturers. These beads range in size such that none will be retained on U.S. screen size No. 10 and about 1 to 5% will go through U.S. screen size No. 40.

A particularly suitable polystyrene plastic is that designated as "Dylite" which is in the form of beads and made by the Koppers Company, Inc. These bears can be given a pre-expansion treatment by heating them at 180–240° F., very often in the presence of live steam, until a density of 1–5 lbs. per cubic foot is obtained. These polystyrene beads contain a volatile liquid, pentane, as an expanding agent. However, particulate polystyrene containing any volatile liquid expanding agent or containing one of the solid chemical expansion agents which decompose to yield a gaseous expansion agent on heating can be employed. Although a polymer of styrene is preferred, any thermoplastic containing such a volatile liquid or solid chemical expansion agent giving it the capability of being foamed upon the application of heat, can be used in the method of the invention. By way of specific example, "Dylite" beads can be prefoamed or pre-expanded before molding either in an oven or special apparatus designed for this purpose like the Rodman Steam Pre-Expander, a development of the Koppers Company, Inc. which will produce pre-expanded beads having a density varying from 1 to 20 lbs./cu. ft. However, where pre-expanded beads are employed, it is first necessary to bring the beads up to molding temperature before molding the finished article. This has the practical disadvantage of increasing the time of the molding cycle. Accordingly it would be desirable in the molding of articles from pre-expanded beads to reduce the molding cycle.

It is, therefore, an object of this invention to provide an apparatus which will mold pre-expanded plastic beads into finished articles at a more rapid rate than heretofore obtained.

A further object of this invention is to provide a molding machine in which pre-expansion and molding of the foamable plastic beads takes place in the same apparatus.

A further object of this invention is to provide a molding machine in which separate pre-expanding equipment would be eliminated.

These and other objects will be apparent from the description which follows.

The novel apparatus of this invention consists of a molding machine having one station in which foamable plastic beads are pre-expanded by heat and means for bringing these hot beads directly to a second station in which molding of the beads into finished articles takes place.

The present invention will be better understood by reference to the following description and drawing in which:

FIGURE 1 sets forth in cross-section a preferred apparatus for carrying out the invention.

Figure 2:
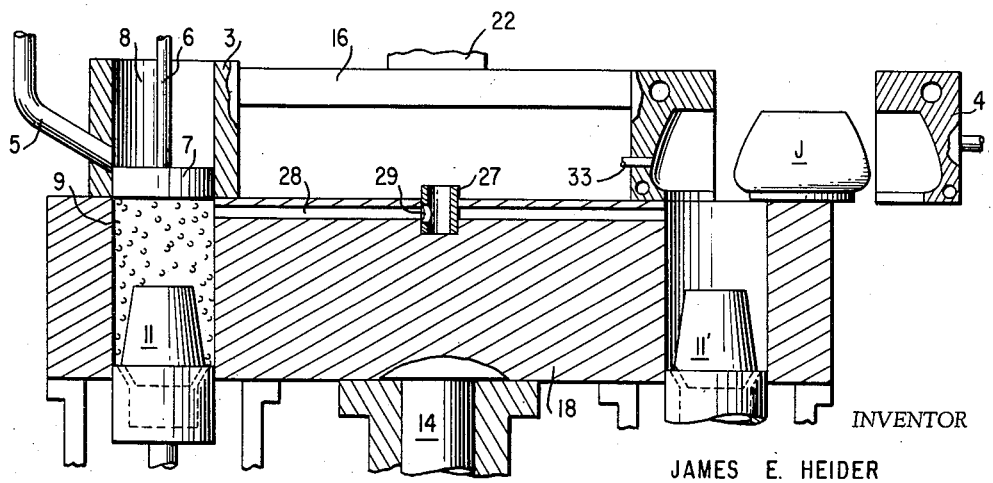

FIGURE 2 is similar to FIGURE 1 but illustrates a later molding operation.

In the drawing numeral 1 designates the upper mold member consisting of a molding station 4 and a pre-expanding station 3 within which a plunger 7 is reciprocated by a ram 6 connected to cylinder 10. Leading into the pre-expanding station is a conduit 5 which is connected to a metering system (not shown) which introduces a prescribed amount of expandable plastic beads P. It will be noted that the pre-expanding station consists of an upper member 3a and a lower member 3b which defines a chamber C that consists of an upper portion 8 and a lower portion 9 which is connected to a source of steam. Reciprocably operating within the pre-expanding station is a force plug 11 mounted on piston rod 12 whose lower end is mounted in cylinder 13. Corresponding to members 11, 12 and 13 are members 11', 12', and 13' which make up the other half of lower member 2. Corresponding to yoke 16, which connects stations 3 and 4 of member 1, is yoke 18 which connects the two halves 19 and 20 of lower member 2 which underlie members 3 and 4, respectively. Yoke 16 is held firmly in place by bracket 21 supported by fixed beam 22. On the other hand yoke 18 is supported by base 15 and is rotated by shaft 14 through suitable gearing by a source of power (not shown). In addition a source of steam is provided for introducing steam into lower portion 9 by conduit 25, sleeve 27, channel 28, and opening 29. Channels 28 and 38 in sleeve are positioned at 180° with respect to each other.

The process employed in using the above described apparatus is as follows: Unexpanded thermoplastic beads, which contain a volatile liquid that will cause the beads to expand upon the application of heat, are introduced by conduit 5 into the pre-expanding station 3. Steam is next introduced into the pre-expanding station by channel 28 to expand partially or pre-expand the plastic beads. Plunger 7 is then caused to descend and force the pre-expanded beads into the lower portion 9 (FIG. 2). Shaft 14 is thereafter rotated 180° to align portion 9 with the mold station 4. Steam is next introduced through conduit 33 directly into the mold 4 and also into drilled openings 31 of mold 4. Force plug 11 is then brought up to its final position shown in the right half of FIGURE 1. The combination of this heat and pressure further expands and forms the article into its final desired shape. Upon cooling of the mold the article J is ejected from the mold (FIGURE 2) by opening split mold 4 by means of hydraulic apparatus 35, consisting of ram 36 and cylinder 37, and by retracting plug 11. This ejection can be facilitated by passing air under pressure into conduit 33. To insure sufficient cooling of the finished article J before its removal from the mold, a cooling fluid is circulated through opening 31 in mold 4. This fluid, which can be cold water, can be admitted through the same connections as the heating fluid or steam by suitable valving and the like, none of which has been shown.

From the above description it will be apparent that various modifications can be made without departing from the scope and spirit of the present invention. For example, the heating means have been referred to as being steam, but hot air can be employed and other heating means such as electrical heating can be employed including resistance and dielectric heating. It is also contemplated that the shaft 14 and gearing means 26 for rotating lower mold 2 can be designed to rotate 180° forward and then 180° backward in an oscillating manner instead of rotating in one direction 180° at a time. Although a thick walled container J, such as a cold cream jar, is shown as the finished product, thin walled containers for coffee or ice cream can also be formed with the present apparatus by appropriate design of the cavity in mold 4. In this connection one of the heating conduits (31 or 33) can be dispensed with and yet obtain sufficient heat to expand and fuse the plastic beads P in the final molding step at station 4. Moreover, with the forming of simple types of containers having no undercut surfaces, the two part mold 4 with its auxiliary apparatus 35 for opening the same can be omitted since the injection of air at 33 will ordinarily be sufficient to release the formed article from the mold. In the event some sticking of the article to the mold occurs, the mold can be lubricated thereby insuring that the air ejector will expel the article from the mold 4 upon withdrawal of plug 11'.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the description set forth herein but rather that the claims be construed as encompassing all the features of patentable novelty which reside in the present invention including all features which would be treated as equivalents thereof by those skilled in the art to which the invention pertains.

What I claim is:

1. An apparatus for molding articles from expandable plastic beads comprising a chamber for receiving said beads having a first member and a second member, said first member including a plunger therein for compressing the beads and forcing the beads into said second member, a plug in said second member, a female mold member adapted to cooperate with said plug, means for moving said second member into molding relationship with said female mold member; means for reciprocating said plug in and out of said female mold member, and means for heating said male mold member.

2. An apparatus for molding articles from expandable plastic beads comprising a chamber for receiving said beads having a first member and a second member, said first member including a plunger therein for compressing the beads and forcing the beads into said second member, a plug in said second member, a female mold member adapted to cooperate with said plug, means for moving said second member and plug into molding relationship with said female mold member, means connecting said first member and said female mold member to hold the same in a fixed position, means for reciprocating said plug in and out of said female mold member, and means for heating said male mold member.

3. An apparatus for molding articles from expandable plastic beads comprising a chamber for receiving said beads having a first member and a second member, said first member including a plunger therein for compressing the beads and forcing the beads into said second member, a plug in said second member, a female mold member adapted to cooperate with said plug, means for moving said second member and plug into molding relationship with said female mold member, means for reciprocating said plug in and out of said female mold member, means for heating said male mold member, and means for opening said female mold member to effect the release of the article formed and molded therein.

4. An apparatus for molding articles from expandable plastic beads comprising a chamber for receiving said beads having a first member and a second member, said first member including a plunger therein for compressing the beads and forcing the beads into said second member, a plug in said second member, a female mold member adapted to cooperate with said plug, means for rotatably moving said second member and plug into molding relationship with said female mold member, means for reciprocating said plug in and out of said female mold member, means for heating said male mold member, and means for opening said female mold member to effect the release of the article formed and molded therein.

References Cited in the file of this patent

UNITED STATES PATENTS

| | | |
|---|---|---|
| 1,626,860 | Mudd | May 3, 1927 |
| 2,325,119 | Flowers | July 27, 1943 |
| 2,621,363 | Fienberg et al. | Dec. 16, 1952 |
| 2,852,809 | Miler et al. | Sept. 23, 1958 |
| 2,961,705 | Wacker | Nov. 29, 1960 |

OTHER REFERENCES

Plastic Technology, pp. 452–455, July 1956.